Feb. 5, 1946.   H. LIST   2,394,316
PRODUCTION OF HIGH IMPULSES OF ENERGY
Filed Oct. 18, 1939
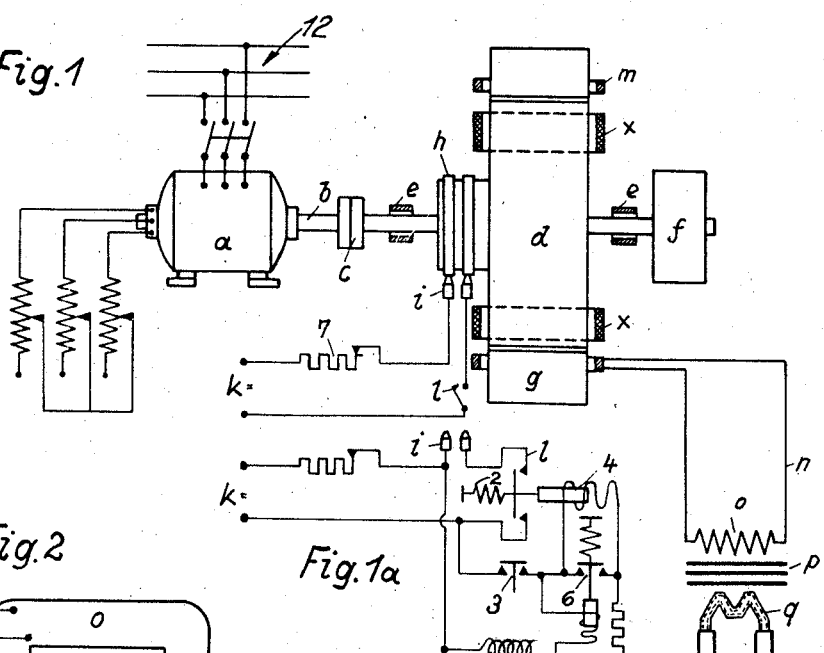
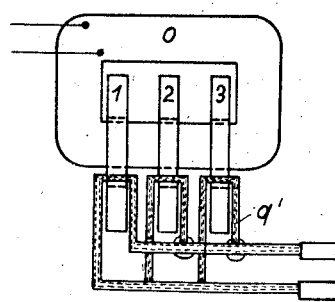
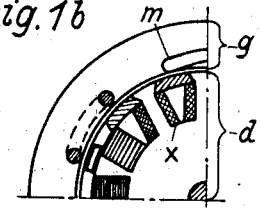
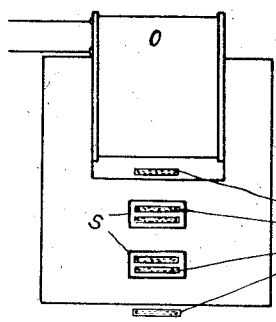
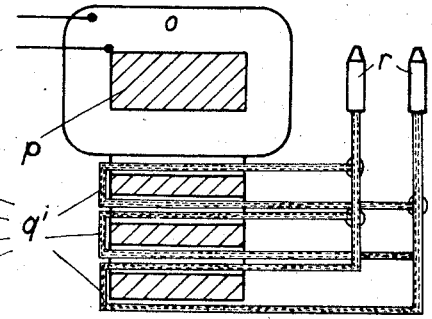
Inventor:
HEINRICH LIST
BY: Haseltine, Lake & Co.
Attorneys Patented Feb. 5, 1946

2,394,316

UNITED STATES PATENT OFFICE 2,394,316

PRODUCTION OF HIGH IMPULSES OF ENERGY

Heinrich List, Berlin-Kladow, Germany; vested in the Alien Property Custodian

Application October 18, 1939, Serial No. 299,951
In Germany January 21, 1933

7 Claims. (Cl. 172—237)

This invention relates to apparatus for producing extremely high impulses of electrical energy of very short duration for welding purposes.

The invention substantially consists in means for converting the mechanical energy stored in rotating masses into extremely high impulses of electrical energy by way of magnetic induction in a very short time with the aid of medium and high frequency generators of electric current, the excitation of the field of the generator being simultaneously increased to a very considerable extent while the number of revolutions of the rotating masses and the excitation of the field can be controlled by suitable means. Another feature consists in means for limiting the controllable current used to excite the generator in its duration by time switches or the like.

Other features of the invention will appear from the following description.

It is well known that in the case of sudden high impulses of load, such as are experienced for example in rolling mills, in welding, and so forth, part of the necessary impulse of energy can be obtained from rotating masses associated and operated with a generator. It is also known that in welding light metals, such as aluminum or the like, the welding process must be completed within a very short period of time in order to prevent the structure of the material from being unduly changed. In such devices, however, various defects have until now always been present, for example in welding aluminium the surface connection was weak, and for solving various though related problems it was always necessary to provide appropriate devices to suit the particular conditions.

These defects are removed by the present invention, which has for its object to provide apparatus for producing controllable impulses of electrical energy of a more or less short duration for various purposes generally, for the electrical resistance welding of light metals, aluminium, copper and the like, for producing extremely high temperatures for chemical processes, and so forth.

The main difficulty in this respect was that when standard generators were utilized the cross sectional area of iron and the magnetic field saturation provided a limit to the energy impulse which could be obtained.

According to the invention, an increase of the frequency of the change of polarity in the field is utilized for increasing the value of energy which can be transmitted in a unit of time. If, for example, in an alternating current generator a given total field flux from rotor to stator and back is obtainable, then at every change of polarity an electric energy impulse is induced, the magnitude of which corresponds to the magnitude of the total field flux. By increasing the number of revolutions of the rotor or by increasing the number of poles the frequency of the field is changed and therewith the frequency of the induced alternating current is increased, so that the value of energy which can be transmitted in a unit of time is also increased. The invention makes use of these means to increase the value of energy. Since the high frequency machines hitherto utilized, as for instance in wire telegraphy, do not yield particularly high impulses of energy when short circuit occurs on the generator side where the load is controlled, the exciting field of a middle or high frequency generator is provided according to the invention with an extremely high number of ampere turns, in order to counteract the reactance of the generator winding. Such field exciter arrangements are easily provided even in the case of a very high number of poles. The various influences of electrical field losses can be counteracted by suitable construction.

In this invention under the term of medium and high frequencies ranging from above 300 cycles upward to 100,000 cycles per second are understood, while 300 to 10,000 cycles per second are employed as the principal range.

If less than 300 cycles are used the transformer will become too big and too heavy, with more than 10,000 cycles the generator may become somewhat too large. For welding light metals 1,000 to 8,000 cycles have been used with advantage.

The means so far described, which are known per se in various fields of electrical engineering, are combined with each other and with other known means for storing mechanical energy, for instance a flywheel, the mechanical energy stored in the flywheel being converted into electrical energy.

The reactance losses experienced in the transmission and utilization of such high frequency electrical energy impulses cause a considerable reduction of voltage with the increase of frequency. For this reason, and in accordance with the principles of the invention, high frequency generators with the highest possible voltage and with correspondingly low amperage are employed. Reactance losses are then reduced by arranging the forward and return leads in close proximity and also by subdividing individual leads into various branches as well as by avoiding locating the same near iron parts. If at the point of consumption, for instance in the case of resistance welding, particularly high intensity and small tension is required, a step-down transformer is used, the electrodes or other connections being directly attached to the ends of the secondary winding without the interposition of long leads, or consumption resistances with large losses being disposed around the field core either as part or in place of the secondary winding.

This combination of means known partly per se makes it possible to manipulate comparatively high output impulses easily by means of transformers, in which only very small quantities of iron and copper are used, so that the devices in question can be held and manipulated by hand. Thus, for example, spots of metal of great conductive capacity, such as aluminium, copper and the like, can be welded according to the double spot welding process, even if the materials are fairly thick, with the aid of hand apparatus. The method of producing energy impulses, as described above, may be utilized, in addition to the fields of application already referred to, for producing very high temperatures for chemical and metallurgical processes and the like, since it is possible to generate thereby temperatures which could not be achieved with processes known in the art.

For this special purpose the current for exciting the inductor can be limited by means of time switches, maximum current relays or other automatic devices, so that a certain amount of energy is converted in the shortest possible time ($1/100$ second or even less) and heat losses which may be occasioned by conduction or radiation may be restricted to a minimum.

The inertia of the rotating mass in the rotor and the excitation of the alternating current generator are controlled by varying the intensity of the current and by switching on the exciting current for a limited time. One or more or all of these means may be utilized. The invention actually involves the feature of so grossly overloading the apparatus by excess super-excitation and current that if the current were maintained, the apparatus could conceivably be destroyed at once, but this result is avoided by the shortness and abruptness of the duration and cut-off of the excitation and current. In spite of utilizing high frequency in conjunction with a comparatively high flux saturation the heating of the machine parts will remain within tolerable limits because only loads of exceedingly short duration have to be considered. For this reason it is advantageous not to switch on the exciting current for the generator for long periods and to effect the dispensing of the current on the exciter side.

In the following an embodiment of the invention will be described by way of example with reference to the accompanying drawing.

Fig. 1 shows a device, installed according to the principles of the invention in diagrammatic representation.

Fig. 1a shows the short circuit switch in the generator circuit in detail.

Fig. 1b shows a side view of part of the generator.

Fig. 2 is a plan view of one type of welding transformer.

Fig. 3 is a sectional view of a modified transformer.

Fig. 4 is an end elevational view partly in section of the transformer shown in Fig. 3.

Referring to the drawing there is shown at $a$ in Fig. 1 a driving motor which is energized from a suitable source such as a three-phase supply 12. The motor is coupled to a field magnet core $d$ by means of a shaft $b$ which rotates in bearings $e$. A fly-wheel $f$ is also driven by the shaft $b$. The driving shaft may be provided with a coupling $c$. The magnet core $d$ may be constructed for example in the form of a toothed rotor. The rotor is provided with a field winding $x$ as shown in Fig. 1b. The field winding $x$ provides poles on the rotor and the stator $g$ is formed with slots therein arranged at the same pitch as the poles of the rotor. The stator carries a winding $m$.

The field winding $x$ is excited from a source of current supplied at $k$. The exciting circuit includes an adjustable resistor 7 and a switch $l$. When the switch $l$ is closed current is supplied to the field winding through the brushes $i$ and slip rings $h$ which are connected to the winding $x$.

The short circuit switch $l$ may be constructed as shown in Fig. 1a and is kept in the open position by means of a spring 2. When the key 3 is closed the greatest part of the current flows through the coil 4 serving for closing the switch. Due to a large regulable inductance 5 the switch 6 short circuits the coil 4 of the switch $l$ with retardation and this switch interrupts the exciting current. By varying or regulating the inductance 5 the time of exciting the high frequency generator and therewith the time of the welding may be regulated in wide limits. Practically welding periods of $1/10$ to $1/100$ second are used.

Obviously, other arrangements known in the construction of high frequency machines may be utilized, particularly such, wherein the exciting and generator arrangements are stationary, iron conductor members being moved between them for producing the change of field. The generator winding $x$ is over-dimensioned, or provided with a surplus ampere turns to a very considerable extent and it is also made adjustable, so that the field excitation can be varied according to the desired utilization of the energy impulses.

A certain continuous output of the generator is determined by the inner diameter and the length of the bundle of sheets of the stator, that is the output which can be obtained by the generator without being unduly heated. In order to obtain this output a certain output of the exciting field or a certain normal ampere winding number is necessary. When the generator is used during short periods only the upper limit of heating the generator is not to be taken into consideration and therefore the output of the generator can be greatly enhanced. In order to achieve this result a greater number of ampere turns for the excitation is necessary and with the same output of the excitation an increase of the exciting winding or over-dimensioning of the exciting winding is required.

As has already been indicated, the construction of the core and particularly the excess ampere turns of the winding on the generator are intentionally made so excessive that the only circumstance that prevents the generator from burning up at once because of the gross overload of excitation and current involved is that the currents on short circuit, are of such extremely short duration and so abruptly cut off that currents which could effect such damage do not have time to build up the damaging high temperature nor any effect of melting down or burning the windings.

The induced high or medium frequency current flows through conductors $n$ to a transformer, comprising a primary winding $o$, core $p$ and secondary winding $q$. The transformed current is conducted to the electrodes $r$.

Obviously, the types and constructions of transformers are not exhausted by these examples and for special purposes specially designed and constructed transformers may be utilized to complete the device.

For the purposes of double spot welding two further constructions of transformers are illustrated in Figs. 2 and 3, these transformers being suitable for producing particularly low secondary tensions. In Fig. 2 the iron core is divided into three parts 1, 2, 3 which have a common primary winding $o$. On the secondary side are disposed the individual loops $q'$ which are connected in parallel and lead to the electrodes.

In Fig. 3 the iron core is not divided. The iron plates have apertures or slots $s$ as shown in Fig. 4 through which the secondary loops are passed. In these embodiments and according to the invention generally the electrodes are directly attached to the secondary winding, or themselves form the secondary winding or part thereof, the construction being altered to suit conditions.

The secondary winding of the transformer may terminate in thick parts of copper which carry the electrodes by means of threads or by means of conical bores.

The invention is thus not restricted to the embodiments described. In particular, the flywheel may be disposed in the rotor itself, so that a separate flywheel $f$ is omitted.

The flywheel may be associated in a different manner with the generator; preferably the flywheel is connected by flanges to those parts of the rotor which carry the bundle of sheets of iron. With another embodiment of the invention the iron of the rotor itself may be dimensioned in such a manner that these parts form the flywheel.

In the following claims it is understood that the expression "generator" may mean any electrical apparatus which produces an output current and thus includes transformers as well as rotary converters and rotating generators.

I claim:

1. Apparatus for producing relatively high frequency impulses of electrical energy of short duration comprising in combination, a medium and high frequency generator for producing frequencies ranging from at least 300 cycles to 100,000 cycles per second, a rotor for said generator, a field winding and a main winding for said generator, a fly-wheel mounted for rotation with said rotor, means for rotating said rotor and fly-wheel, means for super-exciting said field winding, a high frequency transformer for frequencies between 300 and 100,000 cycles per second directly and permanently connected with said main winding, and time-controlled means for limiting the duration of the super-excitation of said field winding.

2. Apparatus for producing relatively high frequency electrical impulses of short duration comprising in combination, a medium and high frequency generator for producing frequencies ranging from at least 300 cycles to 100,000 cycles per second, a rotor for said generator, a fly-wheel mounted for rotation with said rotor, means for rotating said rotor and fly-wheel, a field winding and a main winding for the generator, a source of current, a circuit for impressing the voltage of said source across said field winding, an adjustable resistance in said circuit, a time-controlled switch in said circuit, a medium and high frequency transformer having secondary and primary windings for frequencies between 300 and 100,000 cycles per second, and a permanently closed circuit between said main winding and the primary winding of said transformer.

3. Apparatus for producing relatively high frequency electrical impulses of relatively short duration comprising in combination, a generator for producing frequencies between 300 and 100,000 cycles per second including a rotor and a field winding and a main winding, a fly-wheel mounted for rotation with said rotor, a motor for driving said rotor and fly-wheel, a source of current, a circuit for impressing the voltage of said source across said field winding, a switch in said circuit, means for biasing said switch to an open position, an electro-magnet for closing said switch, time delay means for short-circuiting said electro-magnet, a transformer having a primary and secondary for frequencies between 300 and 100,000 cycles per second, and a permanently closed circuit connecting said main winding with the primary of said transformer.

4. Apparatus for producing relatively high frequency electrical impulses of relatively short duration comprising in combination, a generator having a rotor and a field winding and a main winding for producing frequencies between 300 and 100,000 cycles per second, a fly-wheel mounted for rotation with said rotor, a source of current for exciting the field winding of said generator, said source of current and the turns of said field winding being such that the generator would be destroyed upon continuous operation at excitation of the field winding, time-controlled means for limiting the duration of the excitation of the field winding to fractions of a second, a high frequency transformer having a primary and secondary winding for frequencies between 300 and 100,000 cycles per second, and a permanently closed circuit between said main winding and the primary winding of said transformer.

5. Apparatus for producing relatively high frequency electrical impulses of relatively short duration comprising in combination, a generator for producing frequencies between 300 and 100,000 cycles per second including a rotor and a field winding and a main winding, a fly-wheel mounted for rotation with said rotor, a motor for driving said rotor and fly-wheel, a source of current, a circuit for impressing the voltage of said source across said field winding, a switch for closing said circuit, means for limiting the duration of closure of said switch, a transformer having a primary and secondary for frequencies between 300 and 100,000 cycles per second, and conductors arranged adjacent each other providing a permanently closed circuit connecting said main winding with the primary of said transformer.

6. Apparatus for producing relatively high frequencies of electrical impulses of relatively short duration comprising in combination, a generator having a rotor and a field winding and a main winding for producing frequencies between 300 and 100,000 cycles per second, a fly-wheel mounted for rotation with said rotor, a source of current for exciting the field winding of said generator, the turns of said field winding being such that the generator would be destroyed upon continuous operation at said excitation of the field winding, means for adjusting the exciting current, means for limiting the duration of the excitation of the field winding to fractions of a second, a high frequency transformer having a primary and secondary winding for frequencies between 300 and 100,000 cycles per second, and means providing a permanently closed circuit between said main winding and the primary winding of said transformer comprising conductors arranged adjacent each other.

7. Apparatus for producing relatively high frequency impulses of electrical energy of short duration for spot welding comprising in combination, a motor driven medium and high frequency generator for producing a frequency between 300 cycles and 100,000 cycles per second, a stator for said generator having a main winding thereon, a medium and high frequency transformer for a frequency between 300 and 100,000 cycles per second and having a primary and secondary winding, a permanently closed circuit connecting the main winding of the stator with the primary winding of said transformer, a rotatable field winding for said generator, a source of direct current, and a switch including a circuit for connecting the direct source to said field winding.

HEINRICH LIST.